(12) United States Patent
Seifert et al.

(10) Patent No.: US 6,281,968 B1
(45) Date of Patent: Aug. 28, 2001

(54) LASER DISTANCE-MEASURING INSTRUMENT FOR LARGE MEASURING RANGES

(75) Inventors: Helmut Seifert, Serba; Martin Penzold, Jena; Ullrich Krueger, Milda; Gero Schusser, Buergel, all of (DE)

(73) Assignee: JENOPTIK Aktiengesellschaft, Jena (DE)

( * ) Notice: Subject to any disclaimer, the term of this patent is extended or adjusted under 35 U.S.C. 154(b) by 0 days.

(21) Appl. No.: 09/426,030

(22) Filed: Oct. 25, 1999

(30) Foreign Application Priority Data

Dec. 28, 1998 (DE) .............................. 198 60 464

(51) Int. Cl.[7] .................. G01C 3/00; G02B 7/28
(52) U.S. Cl. .................. 356/3.03; 396/113; 396/114
(58) Field of Search .................. 396/112, 113, 396/114; 356/3.03

(56) References Cited

U.S. PATENT DOCUMENTS 4,408,853 * 10/1983 Tokutomi et al. .
4,907,026 * 3/1990 Koyama et al. .

FOREIGN PATENT DOCUMENTS

WO/92 05455    4/1992  (WO) .

* cited by examiner

Primary Examiner—Stephen C. Buczinski
(74) Attorney, Agent, or Firm—Reed Smith LLP

(57) ABSTRACT

Laser distance-measuring instrument for large measuring ranges having a transmitting channel and a receiving channel arranged parallel to one another, the receiving lens being a modified single lens comprising a primary lens region with a primary optical reception axis which is aligned parallel to the optical transmission axis, as well as a secondary lens region with a secondary optical reception axis which is inclined to the primary optical reception axis at an angle $\alpha$, with the result that a primary focal point and a secondary focal point are produced.

7 Claims, 3 Drawing Sheets

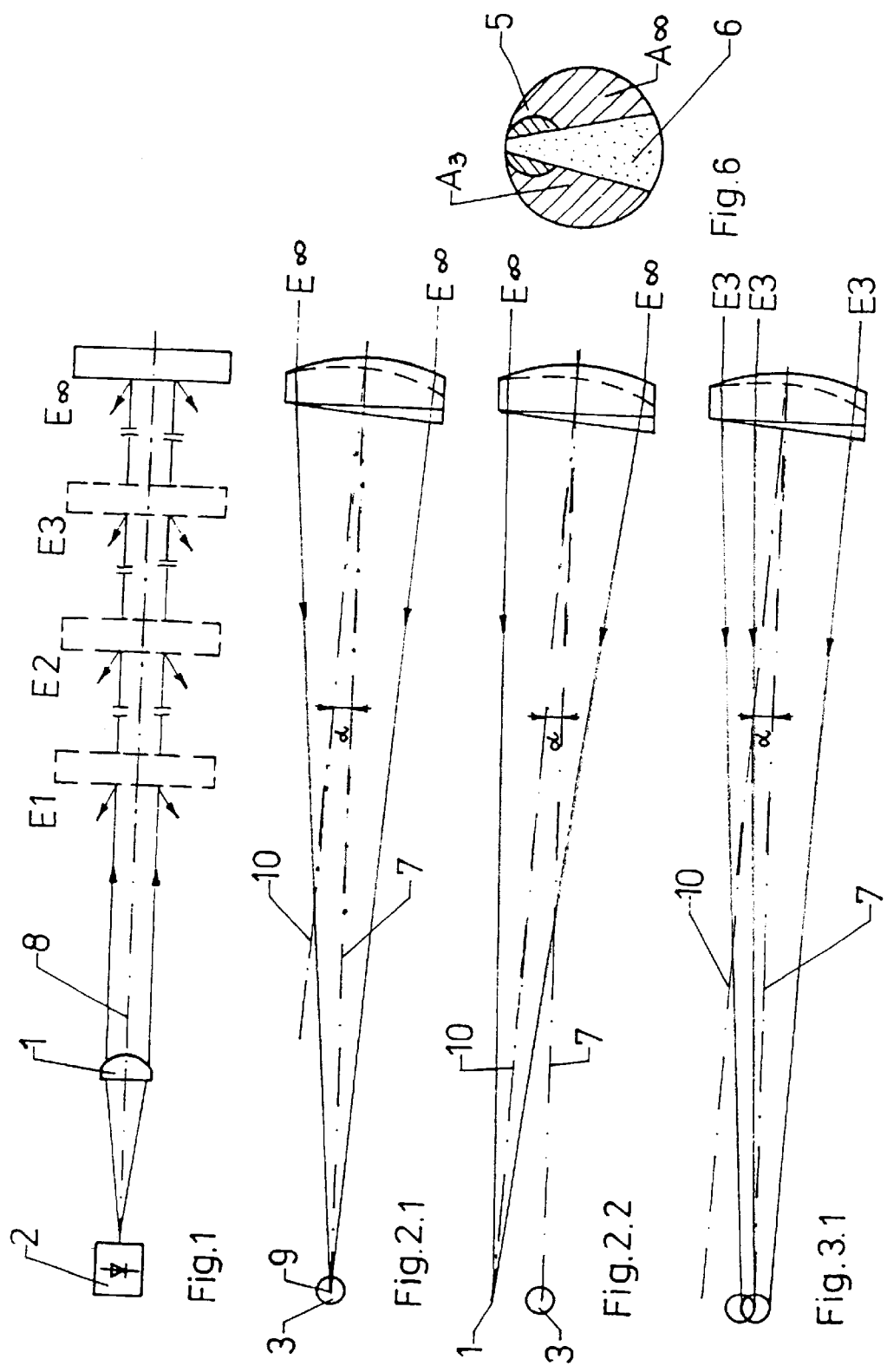

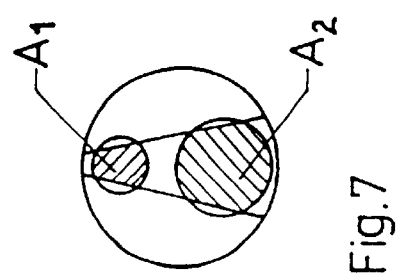
Fig.7
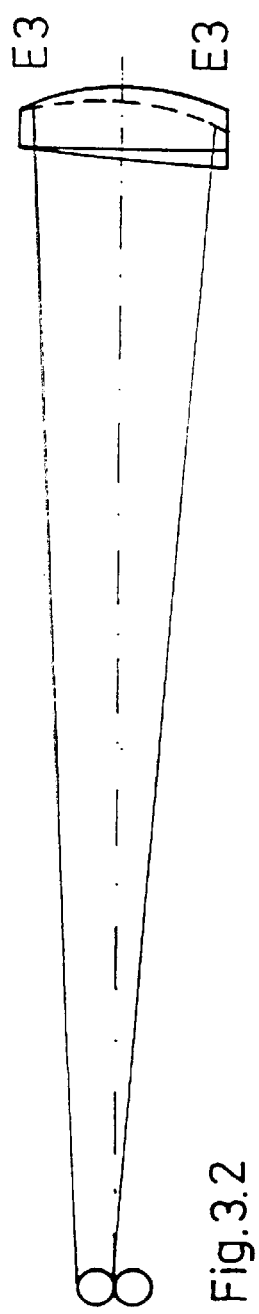
Fig.3.2
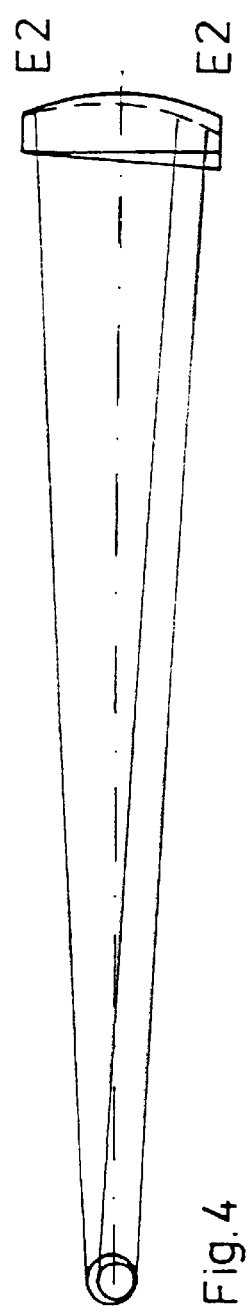
Fig.4
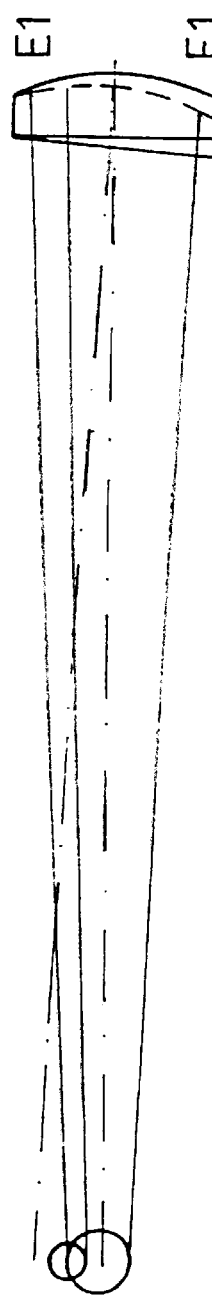
Fig.5

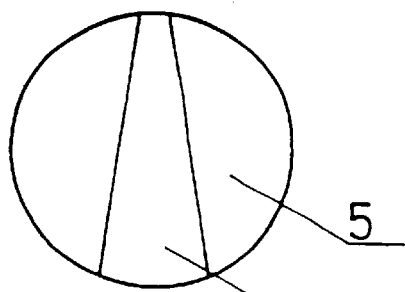
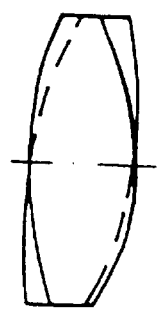
Fig. 8b    Fig. 8a
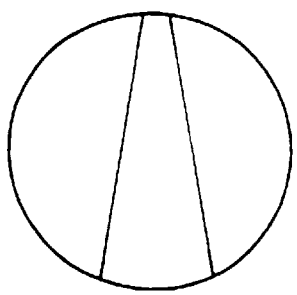
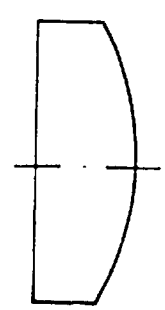
Fig. 9b    Fig. 9a
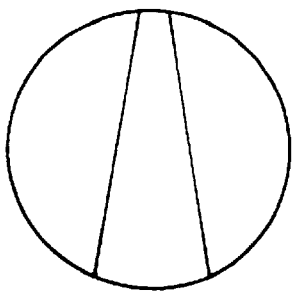
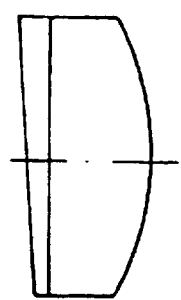
Fig. 10b    Fig. 10a
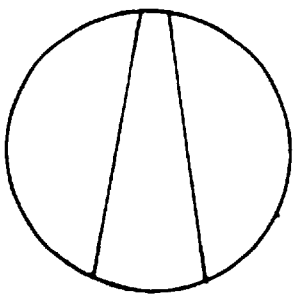
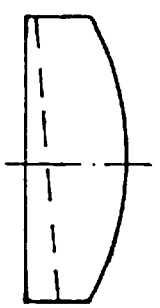
Fig. 11b    Fig. 11a

LASER DISTANCE-MEASURING INSTRUMENT FOR LARGE MEASURING RANGES

BACKGROUND OF THE INVENTION a) Field of the Invention

Laser distance-measuring instruments are based on the principle of pulse transmit time measurement or of phase transmit time measurement.

The phase transmit time method is currently used exclusively with visible semiconductor lasers. It is possible here to implement the overall functioning of the measuring laser and the sighting laser with a cost-effective semiconductor laser.

The disadvantage of the phase transit time method are the extremely small received signals, and the temporally parallel operation of the transmitting system and the receiving system necessitates a powerful receiving system with extremely low crosstalk, transmitting system to receiving system.

b) Description of the Related Art

The distance-measuring instruments known from the prior art which are based on light transmit time measurement can be distinguished in their basic arrangement of transmitting channel and receiving channel into devices in which the transmitting channel is arranged next to the receiving channel, that is to say the optical axes run parallel to one another at a specific spacing, and into devices in which the transmitting channel and receiving channel are arranged coaxially with one another, that is to say their optical axes coincide.

Optical crosstalk, for example owing to backscatter from dust particles in the near zone, can be reduced optically only by two measures: the reduction of the receiver surface, and the axial spacing-of the transmitter and receiver is enlarged. However, the effect of this in the distance range is a rapid migration of the received beam from the receiver. For distances in the near zone, use is made of arrangements with coaxial transmitting and receiving channels, that is to say the transmitting lens, which can also be a single lens, also constitutes the receiving lens. Located within the focal length of this lens is a beam splitter which has the result that the focal plane of the lens is produced in two mutually conjugate planes. Located in these focal planes are the transmitter, on the one hand, and the receiver, on the other hand, with the result that the measuring beam emanating from the transmitter, collimated by the lens, is reflected by the object and is always imaged on the receiver independently of the distance of the object.

This arrangement is suitable for the near zone, since because of the relatively high intensity of the measuring radiation reflected onto the receiver by the object the pick-up angle of the lens, optimized for emitting the measuring beam, suffices for receiving the reflected measuring beam, the dynamic range of the receiver is set such that a reflection of the measuring beam on dust particles is not detected, and a loss in intensity owing to the beam splitter is not a problem.

Because of the low intensity of the reflected measuring beam and the relatively high intensity from the near zone, caused by the optical components (beam splitter, lens), and the dust particles, this arrangement is unsuitable for the far zone.

The parallel arrangement of transmitting and receiving channels is selected for the far zone, that is to say the object to be measured is located at infinity for the receiving lens, which can also be a single lens. Since the measuring spot produced on the object to be measured is always imaged coming from infinity at the focus of the receiving lens, it is possible to dispense with arranging the transmitter and receiver in mutually conjugate planes, and this permits the transmitting and receiving channels to be separated.

This arrangement is suitable for the far zone, since because of the relatively low intensity of the measuring beam reflected onto the receiver by the object the pick-up angle of the receiving lens must be selected larger than the pick-up angle of the transmitting lens, the dynamic range of the receiver is set such that a reflection of the measuring beam on dust particles would be detected when these beam components impinge on the receiver. This is avoided by the spacing of the optical axes of the transmitting and receiving channels and by a small receiver surface, and no additional loss in intensity is produced by a beam splitter.

This arrangement is unsuitable for the near zone because of the parallax produced, which has the effect that as the distance becomes shorter the image of the measuring spot increasingly migrates away from the receiver arranged on the optical axis of the receiving lens.

Taken together, the above statements make it difficult to imagine designing a laser distance-measuring instrument which is suitable for a large distance range. A large distance range is to be understood as a range which comprises both the near zone and the far zone.

The need for such distance-measuring instruments exists, for example, in the construction sector, where a distance range of 0.3 to 30 m is of interest.

Because of the reduction in intensity in the case of the coaxial arrangement, an arrangement with parallel transmitting and receiving channels comes into consideration for a large distance range. Such an arrangement is disclosed in EP 0 701 702 B1. In the laser distance-measuring instrument described here, two basically different solutions are offered, so that even in the near zone the measuring spot is always imaged on the receiver, here the optical conductor entrance surface.

This can be performed, on the one hand, by tracking the optical conductor entrance surface in accordance with the displacement of the imaging position of the measuring spot, specifically only transverse to the optical axis. As specified in the patent, there is deliberately no tracking along the optical axis, since it has emerged that tracking into the concrete image position leads to overdriving of the evaluation electronics, that is to say the dynamic range of the receiver, for which the control electronics are designed, is exceeded.

On the other hand, it is proposed to arrange the optical conductor entrance surface in a fixed version and to ensure by means of optical deflecting means arranged outside the optical axis that the measuring beams entering the receiving lens ever more obliquely in the case of short object distances are directed to the optical conductor entrance surface. Here, as well, it is assumed that it is not a deflection which is correct in terms of imaging optics which is important, since there are no intensity problems in the case of close object distances. The second-named variant has the advantage that it manages without mechanically moving elements in the receiving channel.

However, it has the disadvantage that it is scarcely possible for the signal level (intensity of the measuring beam impinging on the receiver and reflected by the object) to be matched to the dynamic range of the receiver.

If suitable measures ensure that a portion of the measuring beam reflected at the object impinges on the receiver surface, the distance-measuring range is limited by the sensitivity range (dynamics) of the receiver.

The following are essentially decisive for the intensity of the radiation impinging on the receiver surface:

the transmitter power, the loss in intensity over the length of the beam path, equal to double the distance of the object, and the respectively effective aperture range, that is to say the fraction of the surface of the receiving lens which is effective for imaging the reflected measuring beam on the receiver, in each case.

OBJECT AND SUMMARY OF THE INVENTION

As a consequence of this fact, the primary object of the invention consists in modifying the receiving lens such that a changed aperture range becomes effective as a function of the distance, in order to influence the intensity of radiation impinging on the receiver surface such that no overdriving occurs.

According to the invention, this object is achieved by a laser distance-measuring instrument for large measuring ranges having a transmitting channel and a receiving channel arranged parallel to one another. The transmitting channel comprises a transmitting lens with an optical transmission axis at whose focal point a laser light is arranged. The receiving channel comprises a receiving lens in whose focal plane a receiver is arranged. The receiving lens is a modified single lens comprising a primary lens region with a primary optical axis which is aligned parallel to the optical transmission axis, as well as a secondary lens region with a secondary optical reception axis at an angle α, with the result that a primary focal point and a secondary focal point are produced. The secondary lens region has an equilateral trapezoidal shape which runs with mirror symmetry relative to a plane defined by the optical axes, and becomes narrower in the direction of the transmission axis.

It is essential to this solution that the receiving lens is a modified receiving lens with two focal points on the image side. These two focal points are produced by virtue of the fact that the receiving lens comprises a primary lens region and a secondary lens region, the secondary lens region running stretched over the entire diameter of the receiving lens in the direction vertical to the transmission axis and having a trapezoidal shape which becomes narrower towards the transmission axis.

The two lens regions are dimensioned such that a reflected signal situated inside the sensitivity range of the receiver is received over the whole desired distance range of the receiver.

The modified receiving element permits a simple design having a relatively low outlay on assembly and adjustment.

The invention is to be explained in more detail below with the aid of exemplary embodiments.

BRIEF DESCRIPTION OF THE DRAWINGS

In the drawings:

FIG. 1 shows the beam path in the transmitting channel;

FIG. 2.1 shows the beam path in the receiving channel via the primary lens region 5 for an object at infinity $E_{00}$;

FIG. 2.2 shows the beam path in the receiving channel via the secondary lens region 6 for an object at infinity $E_{00}$;

FIG. 3.1 shows the beam path in the receiving channel via the primary lens region 5 for an object at a distance $E_3$;

FIG. 3.2 shows the beam path in the receiving channel via the secondary lens region 6 for an object at a distance $E_3$;

FIG. 4 shows the beam path in the receiving channel via the secondary lens region 6 for an object at a distance $E_2 < E_3$;

FIG. 5 shows the beam path in the receiving channel via the secondary lens region 6 for an object at a distance $E_1 < E_2$;

FIG. 6 shows the effective aperture ranges via the modified receiving lens 4 for an object at the distances $E_{00}$ and $E_3$;

FIG. 7 shows the effective aperture ranges via the modified receiving lens 4 for an object at the distances $E_2$ and $E_1$;

FIG. 8 shows a modified receiving lens 4 made from two biconvex lens parts;

FIG. 9 shows a modified receiving lens 4 made from two planoconvex lens parts;

FIG. 10 shows a modified receiving lens 4 as a planoconvex lens with a wedge-shaped elevation on the plane side in the secondary lens region 6; and FIG. 11 shows a modified receiving lens 4 as planoconvex lens with a wedge-shaped cutout on the plane side in the secondary lens region 6.

DESCRIPTION OF THE PREFERRED EMBODIMENTS

The laser distance-measuring instrument comprises a transmitting channel with a transmitting lens 1 and a laser light source 2 (FIG. 1) which is arranged at the focal point of the transmitting lens 1. The beam emitted by the laser light source 2 is collimated via the transmitting lens 1, and generates a measuring spot on the object to be measured (which is represented to illustrate the mode of operation by way of example at various distances $E_{00} > E_3 > E_2 > E_1$ Arranged in parallel with the transmitting channel is a receiving channel (for example FIG. 2.1) with a receiver 3 and a modified receiving lens 4 which represents the receiving lens and has two focal points located in a plane. The modified receiving lens 4 comprises a primary lens region 5 with the primary focal point 9 and a secondary lens region 6 with a secondary focal point 11.

The primary lens region 5 is decisive for the primary optical reception axis 7, which runs parallel to the transmission axis 8, defined by the transmitting lens 1. The beam reflected at remote objects is imaged via this region. The receiver 3 is advantageously not arranged exactly at the primary focal point 9, but is located moved away therefrom so far in relation to the transmission axis 8 that the measuring spot, coming from $E_{00}$, is still just completely imaged on the receiver 4 (FIG. 2.1).

The secondary lens region 6 determines the position of the secondary optical reception axis 10, which is inclined at the angle a with respect to the primary optical reception axis 7. The beam reflected at objects in the near zone is imaged via the secondary lens region 6. The secondary lens region 6 is an equilateral trapezoidal circular segment whose long side is adjoined by the primary lens section 5 comprising two lens pieces in the shape of circular segments. The cross section of the lens parts, which is the same for all embodiments according to the invention, is to be seen from FIG. 6.

As a result of the trapezoidal shape of the secondary lens region 6 and the arrangement of the modified receiving lens 4, the effective aperture range is reduced the closer the appropriate object is located. The axis of symmetry of the secondary lens region 6 is situated in a plane defined by the transmission axis 8 and the primary optical reception axis 7. The trapezoidal shape becomes narrower towards the transmission axis 8.

The mode of operation of the primary and secondary lens regions 5, 6 is to be explained below by way of example for various distances (FIG. 1).

$E_{00}$—For the object distance $E_{00}$, the beam is imaged via the primary lens region 5 to the primary focal point 9 (FIG. 1.2). Since the diameter of the image is smaller than the receiver surface of the receiver 3, the receiver is displaced away from the transmission axis 8 in the focal plane, so that the imaged radiation impinges just still completely in the edge region of the receiver 3. For an object at the distance $E_{00}$ the entire surface of the primary lens region 5 is active as aperture range ($A_{00}$).

The beam imaged to the secondary focal point 11 via the secondary lens region 6 is represented in FIG. 2.2. The imaging is performed next to the receiver in a fashion offset towards the transmission axis.

$E_3$—The imaging of the beam is represented in FIGS. 3.1 and 3.2 for an object at the distance $E_3$. FIG. 3.1 shows the imaging via the primary lens region 5. Only a part of the image still impinges on the receiver. The associated active aperture range is characterized as the area $E_3$ in FIG. 6. As is to be seen in FIG. 3.2, for this distance, as well, the imaging via the secondary lens region 6 is still not active.

$E_2$—In the case of the beam path represented in FIG. 4, the appropriate object is at a distance $E_2$ which can no longer be detected via the primary lens region 5, that is to say the reflected beam, which is imaged via the primary lens region 5, no longer impinges on the receiver. Instead of this, the radiation which is imaged via the secondary lens region impinges on the receiver. The aperture range effective in this case is represented as the area $A_2$ in FIG. 7.

$E_1$—Since it is known that because of the parallax between the transmitting and receiving channels the reflected beam enters the receiving channel at an angle become larger as the distance becomes smaller, the image moves away increasingly from the optical axis. In the process it "grazes" the receiver (compare FIGS. 4 and 5). For the distance $E_1$, for example, an aperture range as represented in FIG. 7 as the area $A_1$ becomes effective.

A comparison of the magnitudes of the respectively effective aperture ranges represented by way of example shows that the latter become smaller as distance decreases.

The dependence of the effective aperture range on the distance can be influenced by concrete design of the modified receiving lens 4 and the dimensioning of the lens regions relative to one another.

A first example of the structural design of the modified receiving lens is represented in FIGS. 2.1 to 5. Starting from a simple planoconvex lens, a region of an equilateral trapezoidal shape is tilted here over the entire length of the diameter with respect to the adjacent circular segments by an angle $\alpha$. The tilted lens part constitutes the secondary lens region 6, and the other part the primary lens region 5. Further designs are represented in FIGS. 8 to 11.

The primary and the secondary lens regions 5, 6 in FIG. 8 are biconvex lens parts tilted relative to one another.

FIG. 9 shows a modified receiving lens 4 which has a continuous plane surface on the one side and two convex surfaces tilted relative to one another on the other side.

In FIGS. 10 and 11, the modified receiving lens 4 in each case has a continuous convex surface and a plane surface, the plane surface not being continuous but being inclined in the secondary lens region 6 with respect to the primary lens region 5. The inclined surface region can be realized either by an elevation (FIG. 10) or a cutout (FIG. 11).

The mode of operation of the individual designs is essentially the same. They can be produced from one piece or as a cemented group.

While the foregoing description and drawings represent the preferred embodiments of the present invention, it will be obvious to those skilled in the art that various changes and modifications may be made therein without departing from the true spirit and scope of the present invention.

1. Transmitting lens
2. Laser light source
3. Receiver
4. Modified receiving lens
5. Primary lens region
6. Secondary lens region
7. Primary optical reception axis
8. Optical transmission axis
9. Primary focal point
10. Secondary optical reception axis
11. Secondary focal point

What is claimed is:

1. A laser distance-measuring instrument for large measuring ranges having a transmitting channel and a receiving channel arranged parallel to one another, the transmitting channel comprising:

a transmitting lens with an optical transmission axis at whose focal point a laser light source is arranged; and the receiving channel comprising:

a receiving lens in whose focal plane a receiver is arranged;

said receiving lens being a modified single lens comprising a primary lens region with a primary optical reception axis which is aligned parallel to the optical transmission axis, as well as a secondary lens region with a secondary optical reception axis which is inclined to the primary optical reception axis at an angle $\alpha$, with the result that a primary focal point and a secondary focal point are produced;

said secondary lens region having an equilateral trapezoidal shape which runs with mirror symmetry relative to a plane defined by the optical axes, and becomes narrower in the direction of the optical transmission axis.

2. The laser distance-measuring instrument for large measuring ranges according to claim 1, wherein the primary and the secondary lens regions are two biconvex lens parts tilted relative to one another by the angle $\alpha$.

3. The laser distance-measuring instrument for large measuring ranges according to claim 1, wherein the primary and the secondary lens regions are two planoconvex lens parts tilted relative to one another by the angle $\alpha$.

4. The laser distance-measuring instrument for large measuring ranges according to claim 1, wherein the modified receiving lens is a planoconvex lens, the plane surface in the secondary lens region being inclined with respect to the plane surface in the primary lens region by the angle $\alpha$.

5. The laser distance-measuring instrument for large measuring ranges according to claim 4, wherein the secondary lens region constitutes an elevation.

6. The laser distance-measuring instrument for large measuring ranges according to claim 4, wherein the secondary lens range constitutes a cutout.

7. The laser distance-measuring instrument for large measuring ranges according to claim 1, wherein the receiver is arranged offset so far from the primary focal point in the direction of the optical transmission axis that the beam reflected from the remotest object, which is imaged via the primary lens region, impinges on the edge region of the receiver.

* * * * *